US000001244H

United States Statutory Invention Registration [19]

[11] Reg. Number: H1244

Evans

[43] Published: Oct. 5, 1993

[54] DEVICE FOR ABSORBING RESONANCES IN LARGE CIRCULAR CAVITIES

[75] Inventor: Gary E. Evans, Hanover, Md.

[73] Assignee: United States of America, Washington, D.C.

[21] Appl. No.: 968,921

[22] Filed: Oct. 30, 1992

[51] Int. Cl.[5] ..... H01P 1/16

[52] U.S. Cl. ..... 333/251; 333/248; 333/253

*Primary Examiner*—Bernarr E. Gregory

*Attorney, Agent, or Firm*—Thomas E. McDonnell; Charles J. Stockstill

[57] ABSTRACT

A device for absorbing resonances in a large circular cavity such as a microwave rotary joint that utilizes a horizontally positioned resonance absorber positioned in the balun cavity to absorb the resonances or undesired modes. The resonance absorber forms a folded slot with a resistor across its arms to interrupt the circumferential flow of current in the rim of the cavity without affecting the normal desired mode.

13 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EQUIVALENT CIRCUIT

DEVICE FOR ABSORBING RESONANCES IN LARGE CIRCULAR CAVITIES

BACKGROUND OF THE INVENTION

1. Field of the Invention

The present invention relates generally a large circular microwave cavity device capable of supporting higher transmission modes with a resonance absorber for suppressing unwanted modes.

2. Description of the Related Art

Several types of microwave devices have large circular regions capable of supporting higher transmission modes, an example would be a circular combiner (or divider) that ties many inputs into a singular output. In the circular combiner, the coaxial inputs are spaced around the circumference of a flat circular cavity at an equal radius from the central coaxial output. The cavity consists of a top and bottom,ground plane spaced by air or other dielectric. Although the circular combiner is large enough to propagate many modes, it depends upon symmetry in the location of the inputs, voltage, and phase to avoid generating anything but the simplest uniform mode.

Another device capable of propagating many modes is the "pancake" rotary joint which requires a large diameter central hole and consequently a large diameter coaxial path. Moding, the presence of one or more undesired modes or resonances, is avoided in the "pancake" rotary joint by driving it with equal phase and amplitude at many points around the circumference. If there is an imperfect amplitude or phase, higher modes will be excited.

Devices, such as the "pancake" rotary joint, are several wavelengths in circumference and will propagate higher order modes that do not have circular symmetry. Unbalance in drive or lack of in symmetry in manufacture will inject energy into these modes, and couple energy out of them. The path lengths are very different in the various modes thereby causing their signals to add and subtract with each other thus causing variations in impedance and losses as a function of rotation. A resonance also occurs when a weakly coupled mode has a path length that is an integral number of wavelengths.

In the past, an attempt has been made to correct the problem of maintaining an equal drive by the use of terminated couplers in the circuit. However, this requires the adding of high power loads to the circuit and a means of transferring the load heat to the outer body which adds considerably to the size and weight of the device. An alternate solution is to slot the body of the device between the drive points. This interrupts the unbalanced modes and results in a current along the rim of the coupler that is intercepted by the absorber in the slots. However, the body structure of the device is weakened because the slot between the drive points must be a quarter wavelength deep.

For many applications, even folding the slot is inadequate because cutting into the circumferential wall weakens the structure at a location where the utmost of accuracy is required. However, in the design of a low frequency rotary coupler, none of the above approaches have been found to be practical because there is insufficient room for either isolation couplers or quarter wavelength slots in the body because at the operational frequency of the device the slots would be many inches in length. Also, using a folded slot unacceptably weakened the structure and interferes with the desired mode.

At low frequencies, such as 1 GHz, such a slot would be three inches deep and therefore unacceptable.

SUMMARY OF THE INVENTION

The objective of this invention is to provide a rotational coupler for use at microwave frequencies that absorbs undesired resonances or modes and does not detract from the structural integrity of the device.

In this invention, an improvement is made to the construction of large circular cavities by the use of horizontally positioned, resonance absorber, or folded slot, to interrupt the circumferential flow of current in the rim of the cavity without affecting the normal desired mode. By locating resonance absorber in the balun area of the cavity, the structural integrity of the device is preserved and a smaller device may be produced.

BRIEF DESCRIPTION OF THE DRAWINGS

The drawings associated with this invention are described below. In all drawings similar components parts have been identified using similar numbers to prevent confusion.

FIG. 1(*b*) shows the equivalent circuit of the preferred embodiment of the invention.

FIG. 2(*b*) shows the absence of losses normally associated with microwave cavities when the resonance absorber described in the preferred embodiment is inserted into the device.

DETAILED DESCRIPTION OF THE INVENTION

The construction and use of microwave rotary joint is well known within the art. Further, it is well known within the art that the basis of any mechanism for absorption of undesired modes, or resonances, is the differences in location, or orientation, of the fields that distinguish the desired, or normal or symmetrical, mode from the undesired, resonant or asymmetrical, modes. In this invention the desired mode is uniform, thereby filling the space utilized by the balun and precluding discrimination by field location.

The basis of this invention is the use of differences in field orientation, i.e., the drive points for the desired mode having equal voltage and phase applied, so that there is no circumferential current due to the desired mode at specific points around the circumference. If the drives are unbalanced, there is a voltage difference between the drive points and, therefore, a circumferential current at those points. If the conductor is slotted longitudinally or radially at these points it will interrupt these circumferential currents without affecting the desired mode. The interruption of current causes a voltage across the gap that can be terminated with a resistor.

At any junction between an "unbalanced" line and a "balanced" line, a balancing transformer, or "balun", is required. The stripline feed of the typical rotary joint is unbalanced, since the outer ground planes are at the zero volts and the center is at a voltage, V. The segment of the line being driven is balanced, with a voltage of $\pm V/2$ volts on each half. Therefore, a balun is commonly formed by using a quarter wave long choke in one ground plane. This prevents currents from flowing on the outside of the lower ground plane.

Figure 1A:
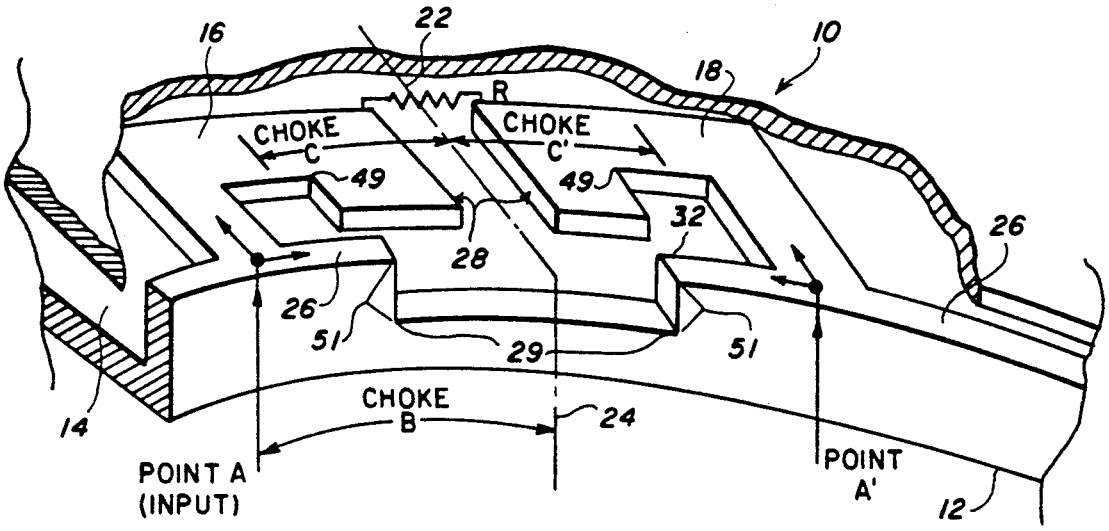
FIG. 1(*a*) shows the position of the resonance absorber in the preferred embodiment of the invention.
Figure 1B:
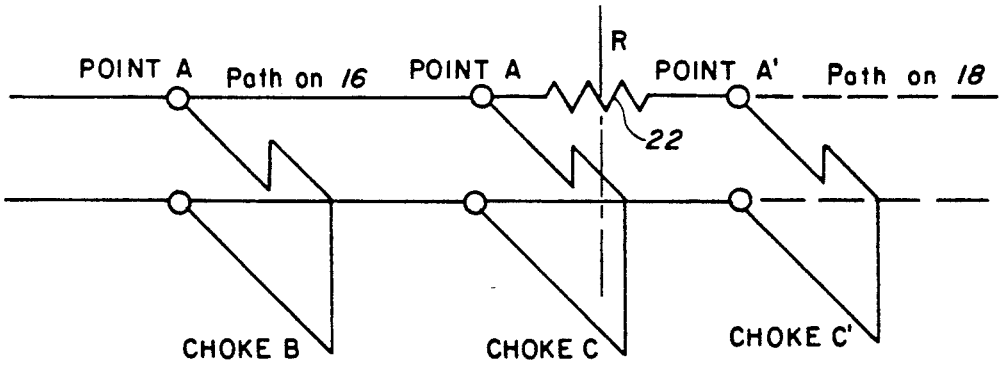

In this invention, the space shown (in FIG. 1(*a*)) for the balun 14 is used to contain the resonance absorber or folded slot 10. The lateral currents due to the undesired modes will occur in the balun 14 as well as on the ring, or Circumferential wall or outer Conductor, 12.

As shown in FIG. 1(*a*), the resonance absorber 10, has been moved from the ring 12 of the device, where it is found in the prior art, to the inner space that is utilized for the balun 14, where it is folded and positioned horizontally. This arrangement reduces the height required for the device and broadbands the resonance absorber 10.

In the preferred embodiment of this invention (FIG. 1(*a*)), the resonance absorber 10 is a metal piece attached to the ring 12 in a flat horizontal position within the balun 14 to form a folded slot. Between the two arms 16 and 18 of the metal forming the resonance absorber 10, a terminating resistor 22 is attached. Nominally this resistor is 300 ohms.

The folded slot 10 is connected to the ring 12 at points A and A′, respectively, which are less than a quarter wavelength from the centerline 24 between drive points A and A′. Halfway between the drive points A and A′, the lateral current is zero for the desired mode. At drive points A and A′, respectively, there is a zero radial voltage for the undesired mode because the current for the undesired mode divides between the ring 12 and the metal forming the folded slot 10. At the centerline 24, the undesired mode has zero voltage (a short circuit).

With a step,or cutout, 51 in the ring 12 that extends between A and A′ and the centerline 24 of the resonance absorber 10; the effective length along the ring is made a quarter wavelength, thereby transforming the short circuit to an open circuit and forcing mos of the current of the desired mode to flow in the metal forming the folded slot 10. This results in the resistor 22 receiving most of the desired mode power.

The resistor 22 is nominally made of carbon but for high power levels it may be made of nichrome deposited on beryllium oxide, ruthenium oxide, tantalum or similar compounds. At the resistor 22, there is a second path formed by the folded slot 10 itself that is specifically designed to be a quarter wavelength short circuited. It therefore is an open circuit in parallel, and of no consequence.

FIG. 1(*b*) depicts the equivalent circuit for the difference mode and showing the effective quarter-wave stub forming choke B for the ring 12 attached at A and A′ and the other stubs forming chokes C and C′ are formed by the folded slot 10 viewed from the resistor 22. The combination provides a direct connection for the desired mode to the resistor 22.

In the preferred embodiment, as shown in FIG. 1(*a*), the folded slot 10 is made of aluminum with a thickness of 3/16 inch, a width of 0.15 wavelength and a depth of 0.05 wavelength. However, copper, brass, silver or a similar material may be utilized in the construction of the folded slot. The slot gap 28 is 0.25 inch to accommodate the 300 ohm resistor 22. The arms of the folded slot 16, 18 forming the slot gap 28 are stepped 3:1 at the halfway point 49 to effectively lengthen it to a quarter wavelength. The slot gap 29 between the ground plane 26 and the ring 12 is also stepped 3:1 51 at the halfway point 24. Being constructed of aluminum, the folded slot 10 also acts as a heat sink conducting heat away from the 300 ohm resistor 22.

Figure 2A:
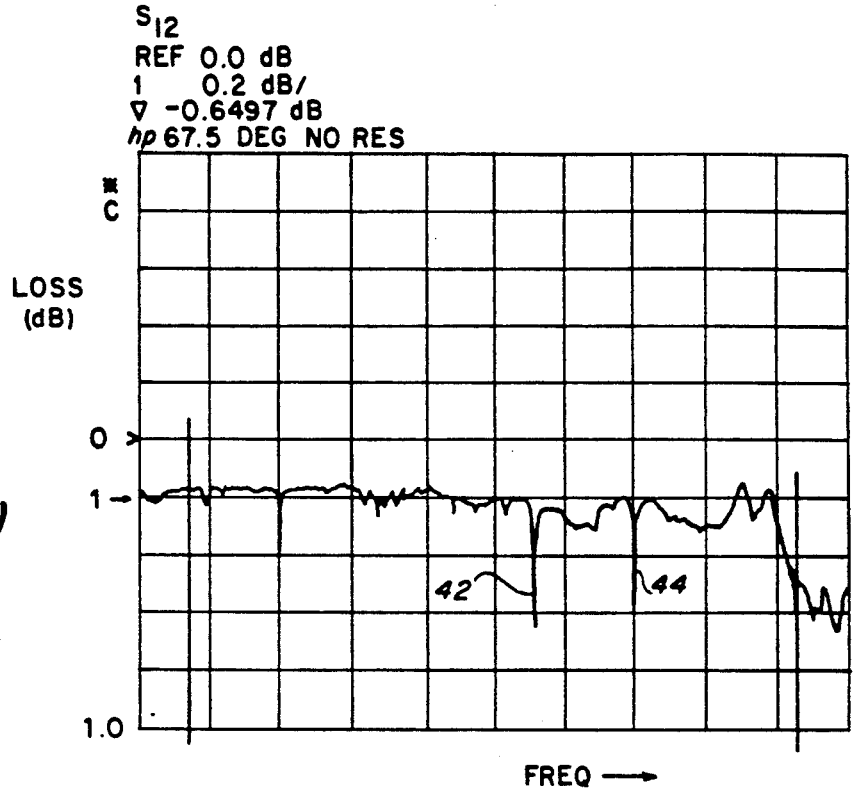
FIG. 2(*a*) shows the losses associate with in a microwave cavity utilizing the techniques for absorbing resonances found in the prior art.
Figure 2B:
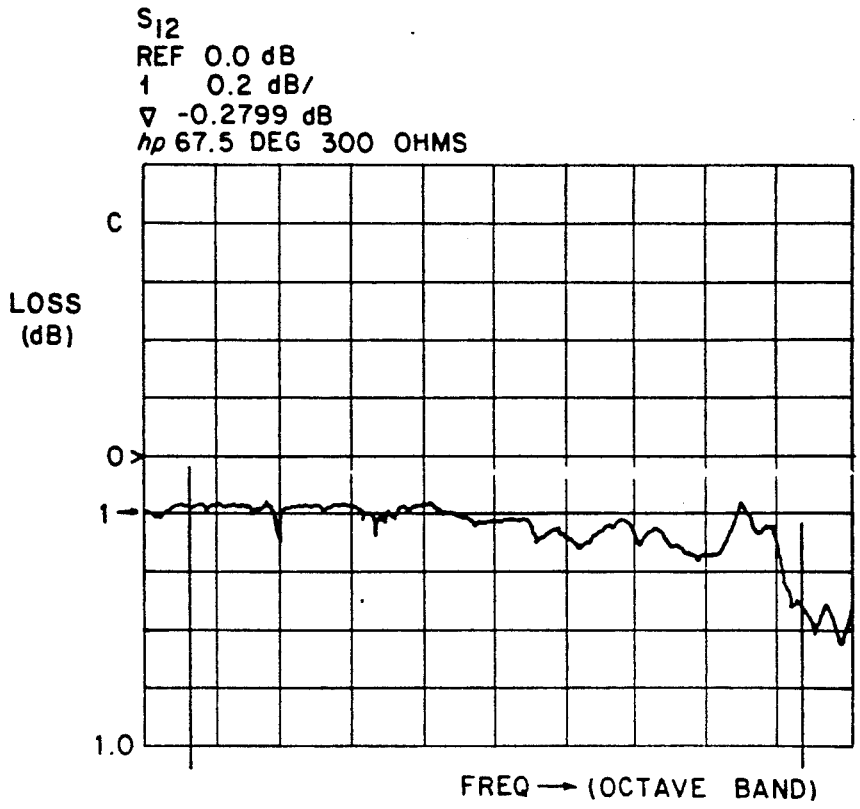

A rotary joint having excessive losses due to resonance (0.1 to 0.5 dB) was modified to incorporate the method disclosed in the preferred embodiment. The resonance in the unmodified device arose from several sources but the larger resonance problem was due to moding. After modification to insert the horizontal folded slot 10, the two loss spikes due to moding 42, 44, shown in FIG. 2(*a*), normally found in a cavity, were absorbed without affecting losses otherwise, as can be seen in FIG. 2(*b*). The structural integrity of the rotary coupler was maintained and the size was not affected.

Numerous modifications and adaptations of the present invention will be apparent to those skilled in the art. For example, a wide variety of specific dimensions are appropriate depending on the frequency band, ring dimensions and the power level at which the invention is to be operated. Thus it is intended by the following claims to cove all such modifications and adaptations which fall within the true spirit and scope of the invention.

What is claimed is:

1. A device for absorbing resonances in a large circular microwave cavity comprising:

a resonance absorber having a gap between a first arm and a second arm located in the balun area of said microwave cavity, and a load resistor connected across said gap between said first arm and said second arm of said resonance absorber thereby electrically terminating the voltage across said gap generated by the interruption of current caused by said gap.

2. A device, as in claim 1, wherein said resonance absorber is a folded slot wherein said first arm and said second arm are one-fourth wavelength in length.

3. A device, as in claim 2, wherein said resonance absorber is horizontally positioned.

4. A device, as in claim 2, wherein said resonance absorber is made of aluminum.

5. A device, as in claim 2, wherein said resonance absorber is made of copper.

6. A device, as in claim 2, wherein said resonance absorber is made of brass.

7. A device, as in claim 2, wherein said resonance absorber is made of silver.

8. A device, as in claim 2, wherein said resonance absorber is made of a material selected from a group of materials comprised of aluminum, copper, brass, silver and similar materials.

9. A device, as in claim 1, wherein said resistor is made of carbon.

10. A device, as in claim 1, wherein said resistor is made of nichrome deposited on beryllium oxide.

11. A device, as in claim 1, wherein said resistor is made of ruthenium oxide.

12. A device, as in claim 1, wherein said resistor is made of tantalum.

13. A device, as in claim 1, wherein said resistor is made from a group of materials consisting of carbon, nichrome deposited on beryllium oxide, ruthenium oxide, tantalum and similar materials.

* * * * *